United States Patent

Sears

[15] 3,648,443
[45] Mar. 14, 1972

[54] CORN PICKER HEAD WITH SPRING-BIASED BUTT STOPS

[72] Inventor: Bobby Joe Sears, Hoopeston, Ill.
[73] Assignee: FMC Corporation, San Jose, Calif.
[22] Filed: Mar. 25, 1970
[21] Appl. No.: 24,044

[52] U.S. Cl. ............................................................56/111
[51] Int. Cl. .......................................................A01d 45/02
[58] Field of Search ..........................56/108–112, 103–104, 56/98; 130/5 A, 5 G; 171/61

[56] References Cited

UNITED STATES PATENTS 3,429,111   2/1969   Looker ................................56/103 X
3,473,614   10/1969   Kemp ..................................56/104 X
1,516,067   11/1924   Tucker ................................56/103 X Primary Examiner—Louis G. Mancene
Assistant Examiner—J. N. Eskovitz
Attorney—F. W. Anderson and C. E. Tripp

[57] ABSTRACT

A sweet corn picker head for market ears includes moving stop bars formed of a pair of driven endless gathering belts having flexible confronting flights of closely spaced upright stop bars that straddle and grip the cornstalks. The upper portions of the confronting flights are resiliently biased toward each other by rollers which are mounted on adjustable leaf springs. The flights thus maintain gripping control of the ears and the ears, regardless of size variations, are positively controlled to prevent clumping and relative horizontal movement between the ears and stop bars.

5 Claims, 9 Drawing Figures

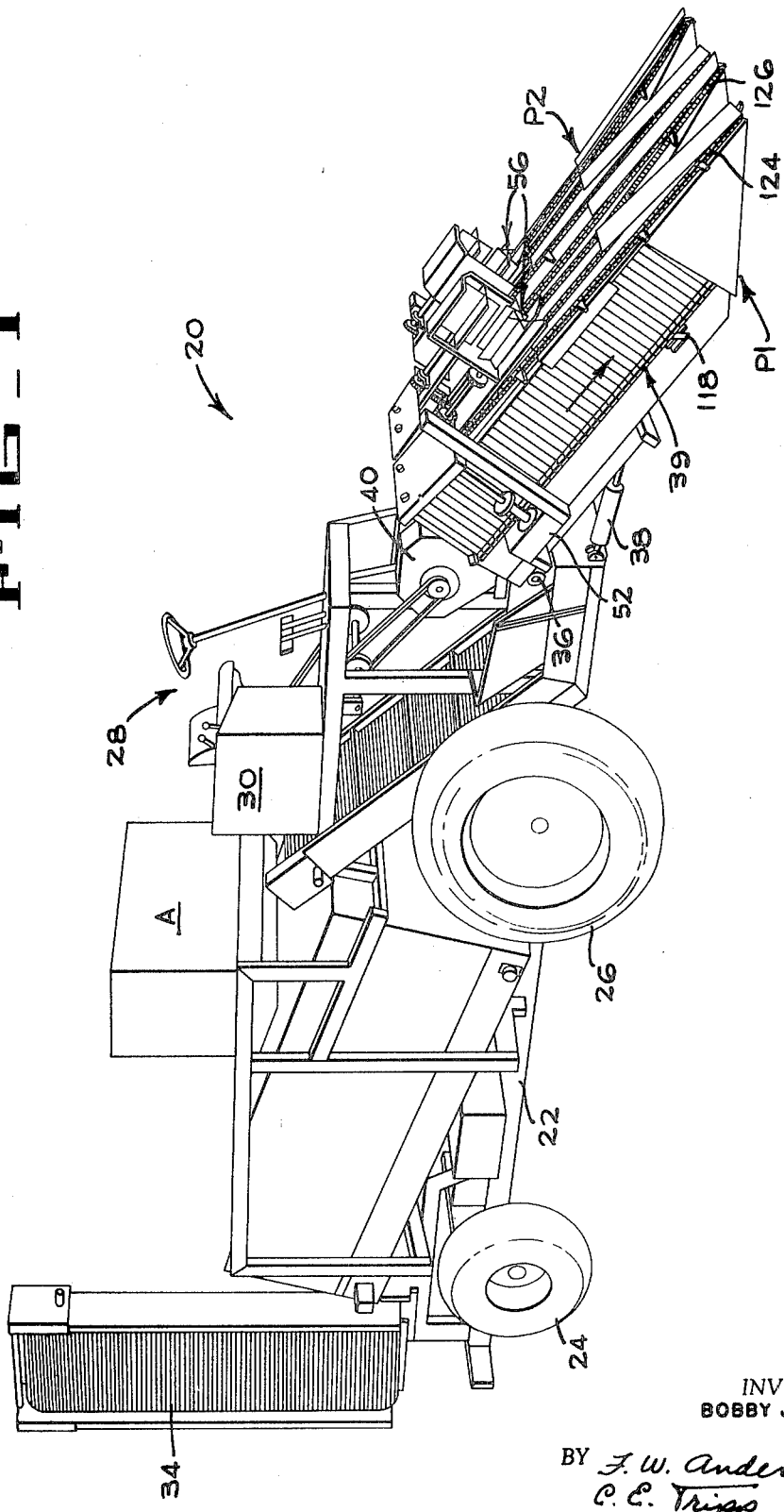

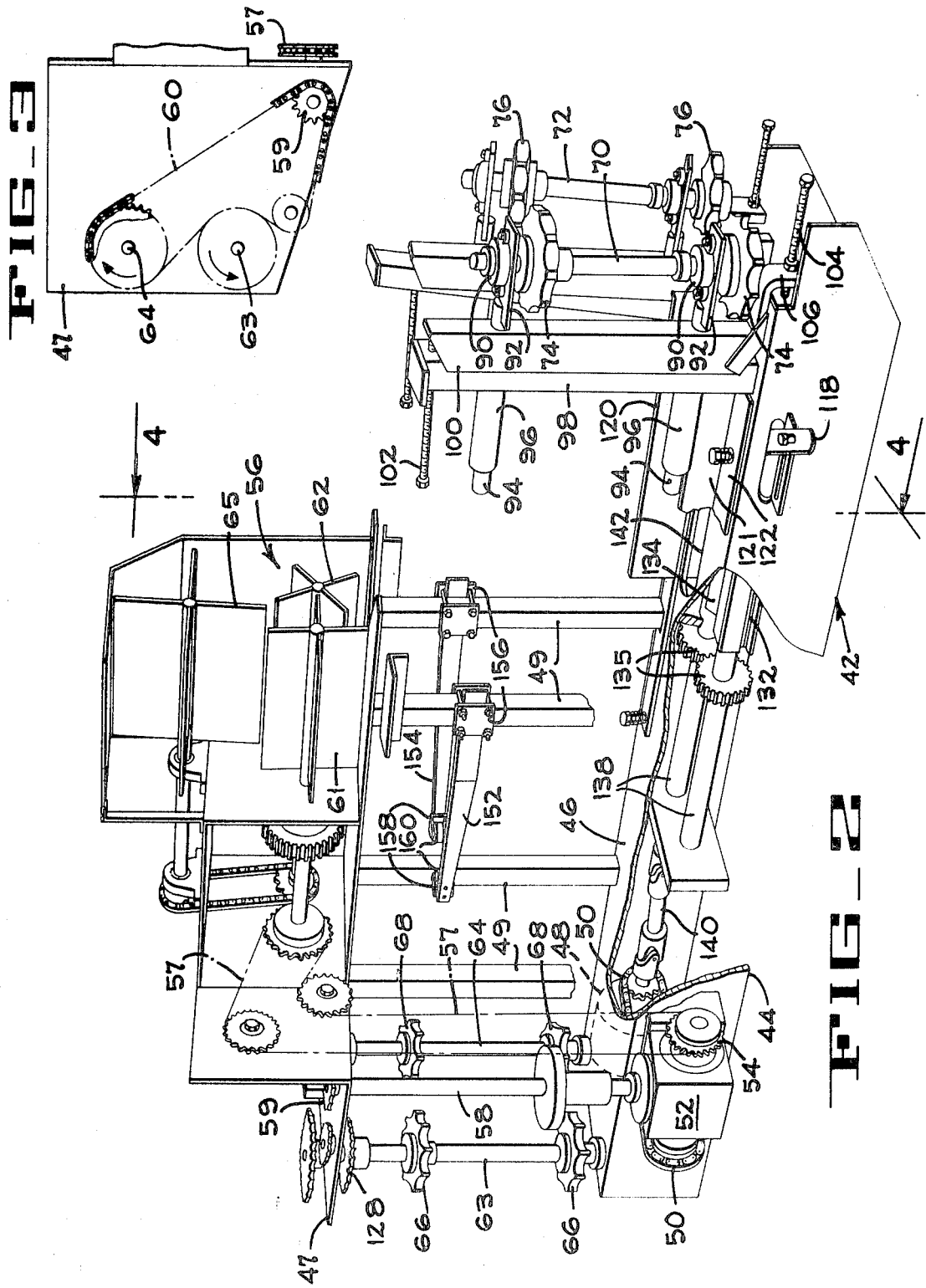

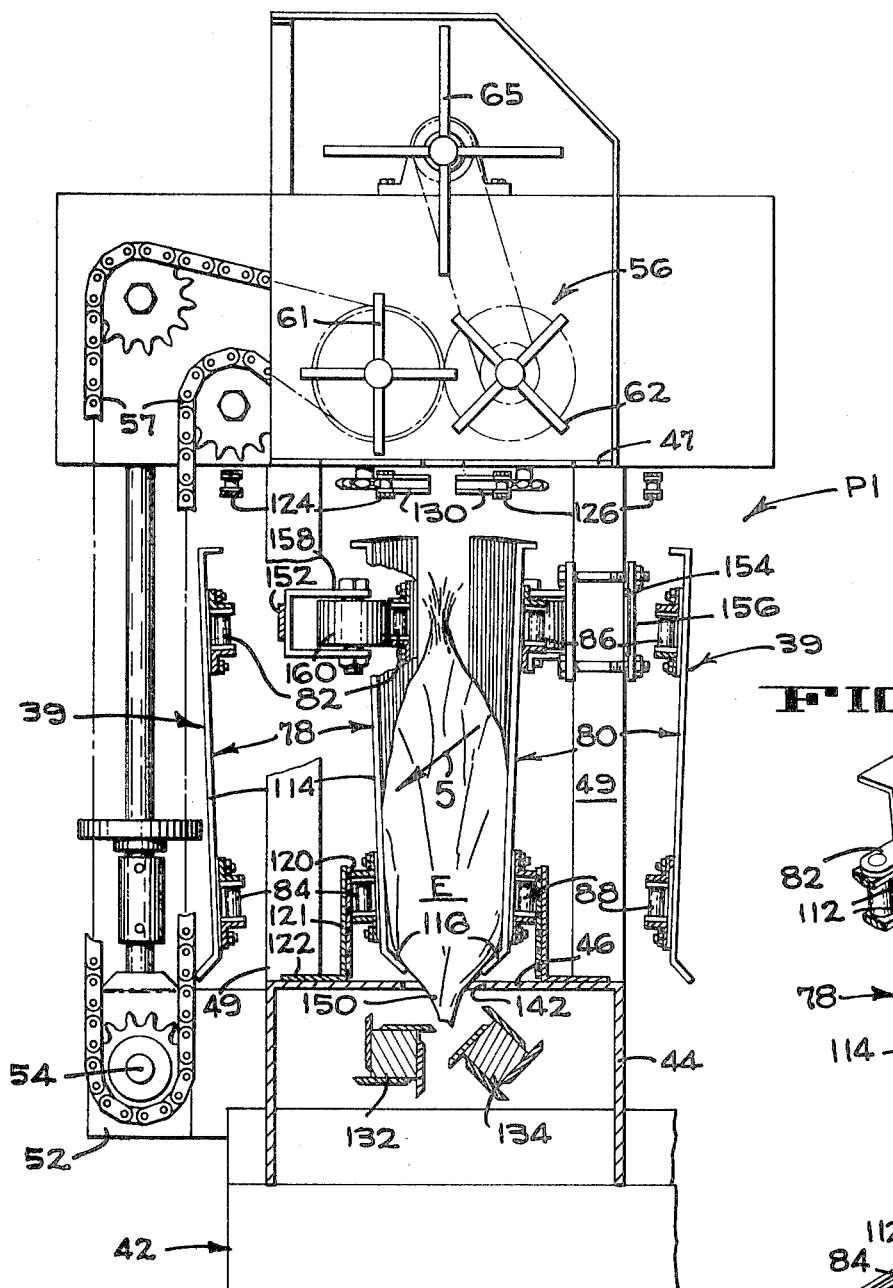
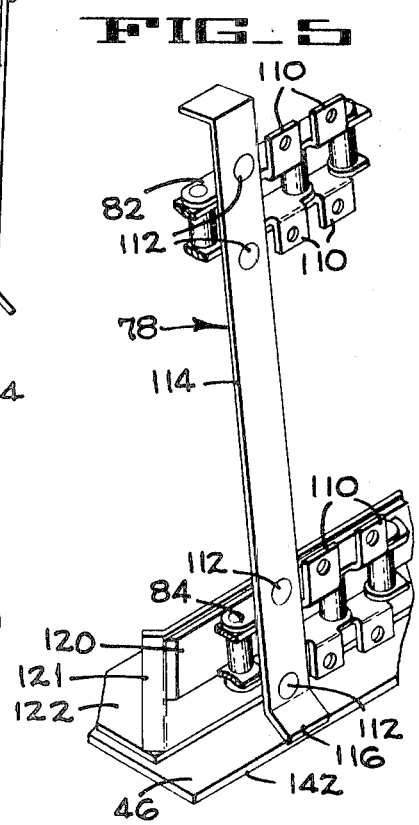
FIG_4
FIG_5

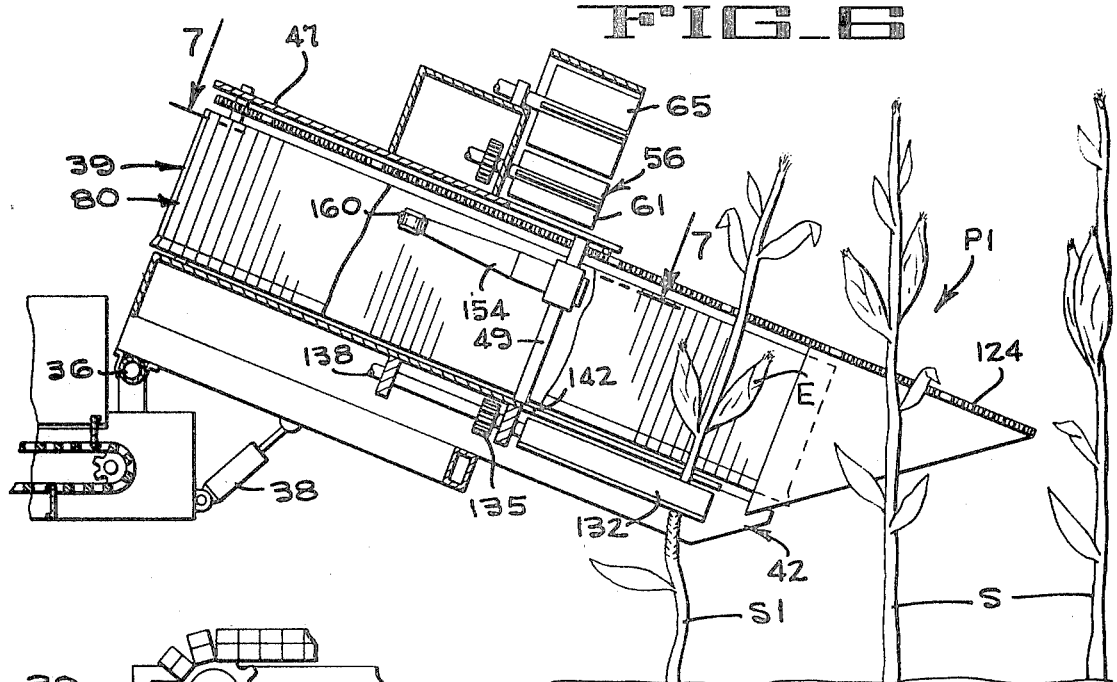
FIG. 6
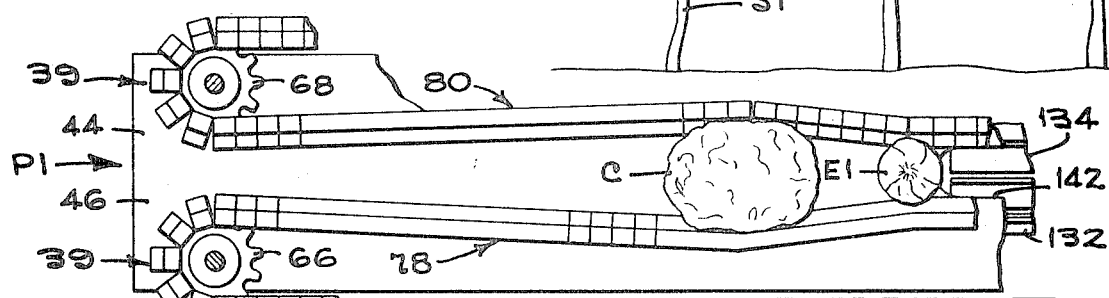
PRIOR ART FIG. 7
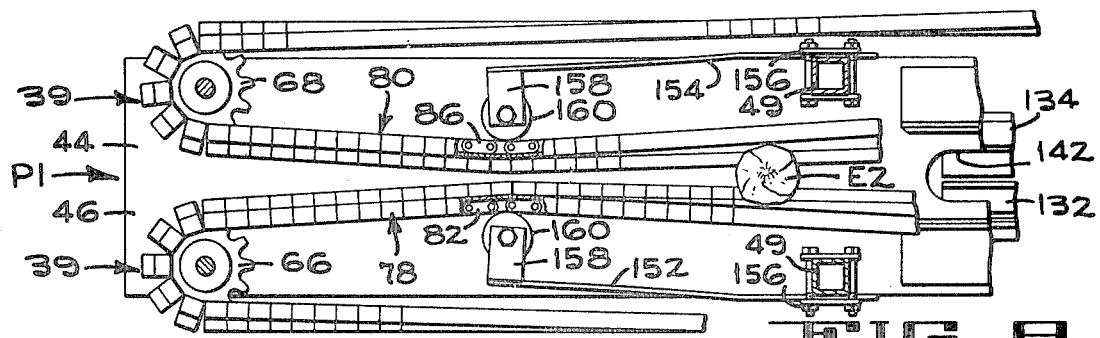
FIG. 8
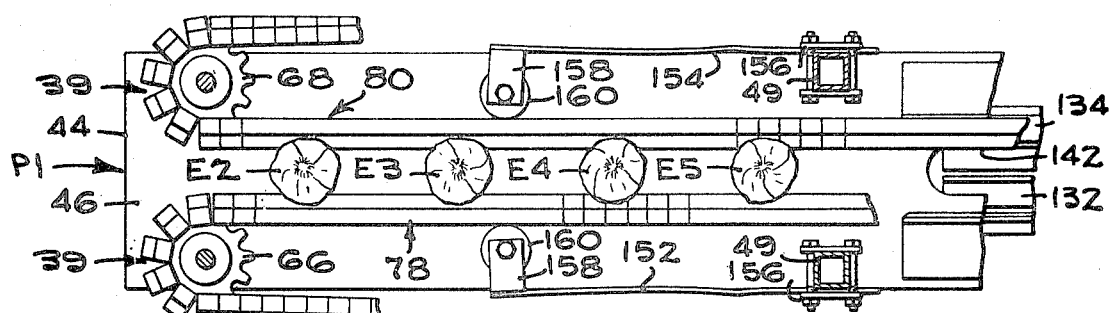
FIG. 9

CORN PICKER HEAD WITH SPRING-BIASED BUTT STOPS

CROSS REFERENCES TO RELATED APPLICATIONS

The present invention is an improvement in the picking head structure disclosed in the U.S. Pat. of Looker, No. 3,499,272 issued Mar. 10, 1970, and assigned to the same assignee as the present application.

BACKGROUND OF THE INVENTION

1. Field of the Invention

The present invention is directed to mobile harvesting machines, and more particularly concerns the picking head of a machine for harvesting sweet corn for table use. The patented picking head includes mechanism which moves along a row of growing cornstalks and pulls the stalks downward while restraining the ears so that the ears are stripped from the stalk. The present invention provides additional mechanism for resiliently biasing the confronting flights of the gathering belts together in order to maintain constant gripping control of the stalks, ears and leaves.

2. Description of the Prior Art

The picking head disclosed in the Looker application, supra, includes moving butt stop flights of upright slats or stop bars having lower ledge portions for supporting the ears. The flights are flexible, and have been found to be less than totally efficient under certain operating conditions. It sometimes happens that gripping control of an ear is temporarily lost, and that further incoming material will build up a large clump against that ear. Thus, a clump of ears and leaves will concentrate in a small area, and force apart the confronting flights of the butt stops. Since flights normally provide light gripping pressure on the harvested material, the described malfunction causes a loss of gripping control on further incoming material because the flights are no longer interspaced the proper distance for gripping adjacent ears, leaves and stalks. One end result is that relative motion between the ears and the flights occurs and causes the husks to be visibly marked. While this might not actually damage the kernels of the ears, it creates a presumption on the part of the customer that the ear is damaged, and makes the ears unacceptable for marketing. When a clump has built up large enough to tension the butt stop flights sufficient to move the clump, it is discharged from the picking head as a large mass of intertwined material. This material is then dropped through the air blast of a blower which is intended to blow out all material lighter than the ears. Thus, the air blast is ineffective to separate the material comprising the clump, and a further adverse result is that the clump usually causes more frequent than usual shutdowns for the purpose of cleaning the machine. Due to space limitations in the picking head, the ears within the clump are also likely to be damaged by compression when the clump is finally ejected.

SUMMARY OF THE INVENTION

The problems set forth above are minimized or eliminated by providing means for resiliently urging the moving confronting flights of the butt stops into gripping engagement with the ears. With this provision, ears of any size are prevented from horizontal motion relative to the butt stop flights so that the normal conveying movement is uninterrupted, and no damaging relative horizontal motion between the ears and the butt flights can occur. The resilient means thus maintains the most effective interspacing of the butt stop flights by providing continuous adjustment thereof.

BRIEF DESCRIPTION OF THE DRAWINGS

FIG. 1 is a perspective of a corn-harvesting machine embodying the present invention.

FIG. 2 is an enlarged perspective of the frame of one of the two picking heads on the leading end of the harvesting machine.

FIG. 3 is a fragmentary plan of the drive end of the picking head frame shown in FIG. 2.

FIG. 4 is an enlarged section indicated by the arrows 4—4 on FIG. 2.

FIG. 5 is an enlarged fragmentary perspective of an endless belt flight indicated by the general arrow 5 on FIG. 4.

FIG. 6 is a diagrammatic operational elevation, partly broken away, of the picking head traversing a row of cornstalks in a harvesting operation.

FIG. 7 is a fragmentary diagrammatic plan illustrating the prior art operation of the mechanism in the area indicated by the arrows 7—7 on FIG. 6.

FIGS. 8 and 9 are diagrammatic plans similar to FIG. 7, but illustrating the mechanism, and operation thereof, of the present invention.

DESCRIPTION OF THE PREFERRED EMBODIMENT

FIG. 1 illustrates a known type of corn-harvesting machine 20 that is fully described and disclosed in the U.S. Pat. to Looker, No. 3,499,272. The patented machine includes a fabricated frame 22 supported by a pair of steerable rear wheels 24 (only one being shown) and powered by a pair of driven front wheels 26 (only one being shown). The harvester is operated by a driver at a control station 28 which includes various hydraulically operated control valves at a console 30. An engine in a housing A powers hydraulic pumps, not shown, to drive hydraulic motors connected to the various machine components.

As illustrated in FIG. 1, the harvesting machine 20 is in a parking position. When the machine is operating in a cornfield, picking heads P1 and P2 on the leading end of the machine are elevated to the position shown in FIG. 6, and a discharge conveyor 34 is lowered to eject the harvested ears of corn into a wagon or truck moved alongside the harvesting machine.

Each picking head is arranged to straddle a row of cornstalks, and in operation the two picking heads are simultaneously pivoted upward about a common pivot axis 36 (FIG. 1) by energizing two hydraulic cylinders 38, only one of which is shown, to elevationally adjust the operating height. The picking heads operate by pulling the cornstalks downward onto the ground, while retaining the ears, so that the ears are separated from the stalks and are maintained in upright growing position between moving, flexible butt stop flights, one of which is indicated at 39, that provide light gripping pressure on the ears. In order to prevent or minimize relative horizontal movement between the ears and the butt stop flights, because such movement might abrade or otherwise damage the ears, the butt stop flights move rearward at a speed approximating the ground speed of the machine. As the ears are discharged from the picking heads, they pass through laterally directed air blasts from a blower 40, so that loose foliage is removed and only the unhusked ears are conveyed to the discharge conveyor 34, under normal operation conditions.

In practice, it has been found that the patented picking heads do not always maintain control of the ears. Because a visual analysis under operating conditions is very difficult, due to the rapid operating speeds and the large volume of material handled, it was considered that the gripping pressure on the ears might not remain uniform, because some of the harvested ears were discharged from the picking heads with entrained foliage, in clumps, and the ears displayed bruised and marked husks which would normally be unbruised and unmarked if the ears were merely conveyed without motion relative to the butt stop flights. Further, the clumps of ears and foliage were sometimes intertwined and did not separate in the air blast from the blower 40. Loss of gripping control on the ears was also considered probable because the malfunction appeared to have a cumulative effect; that is, once a clump of material was discharged from a picking head, it was followed by further clumps which included ears that under usual conditions would be harvested in the normal manner, without damage.

The above-described problems have been practically eliminated by incorporating, into the picking heads of the aforementioned Looker patent, means for resiliently biasing the confronting flights of the moving butt stops toward each other. In this manner, the butt stop flights maintain gripping pressure on the ears, regardless of their size variations, and their normal conveying movement is uninterrupted without damaging relative motion between the ears and the flights. This prevents the previously mentioned clumping action, thus assuring a maximum harvest of undamaged ears.

Continuing with the description of the environmental structure disclosed in the Looker patent, supra, the picking heads P1 and P2 are of similar construction with obvious differences in orientation and reversal of parts. For this reason only the picking head P1 is described in detail to the extent necessary to disclose the present invention.

The picking head P1 (FIG. 2) is provided with a fabricated frame 42 that includes an inverted, channel-shaped base 44 having an apertured top wall 46, and a superstructure including a plate 47 supported by posts 49. Mounted beneath the wall 46 is a hydraulic motor 48 that is coupled by a chain and sprocket drive 50 to the input shaft of a gearbox 52. The gearbox is provided with an output shaft 54 which drives an overhead stalk ejector mechanism 56 via a chain and sprocket drive indicated by the pitch lines 57 (FIG. 2), and an output shaft 58 which carries a sprocket 59 (FIG. 3).

The stalk ejector mechanism 56 is not an essential detail of the present invention, and is more fully disclosed in the Looker patent, supra. Its general function is to eject broken stalks by gripping and ejecting the stalks by means of counterrotating rotors 61 and 62, and a cooperating deflector rotor 65 that pushes the broken stalks laterally away from the picking head.

Sprocket 59 (FIGS. 2 and 3) is provided with a drive chain connection 60 to a drive shaft 63 and a drive shaft 64 which respectively carry pairs of drive sprockets 66 and 68. At the leading end of the frame 42, idler shafts 70 and 72 carry pairs of idler sprockets 74 and 76, and cooperate with the drive shafts to carry a first endless moving butt stop flight 78 (FIGS. 3 and 4) and a second endless moving butt stop flight 80. As shown by the directional arrows in FIG. 3, the confronting flights of the butt stop flights are driven rearward relative to the forward movement of the picker head, and in operation the speed of the hydraulic motor 48 is adjusted so that the flights have only a slight motion rearward relative to the ground, in order to minimize relative horizontal motion between the ears and the moving butt stop flights, while keeping the inlet end of the picking head clear.

As best shown in FIGS. 4 and 5, the butt stop flight 78 includes vertically spaced endless roller chains 82 and 84 that are trained around the pairs of drive and idler sprockets 66 and 74. Similar endless roller chains 86 and 88 are trained around the pairs of drive and idler sprockets 68 and 76 to support and drive butt stop flight 80.

Referring again to FIG. 2, the idler shaft 70 for the butt stop flight 78 is mounted in bearings 90. In order to tension the butt stop flight 78, each bearing is supported by a mounting plate 92 that is welded to a shaft 94. Each shaft 94 is slidably mounted in a tube 96 that extends through and is welded to a square, inclined post 98. Nested over the front of the post 98 is a floating channel 100 having apertures aligned with the tubes 96, and arranged to be positioned in preselected nested relation to the post by bolts 102 and 104. Bolt 102 is threaded through the post 98 and bears against the inner surface of the channel 100.

The lower end portion of the channel 100 carries a forwardly and downwardly extending bracket 106, through which the bolt 104 is threaded into endwise abutment with the frame 42. Thus, the channel 100 can be adjustably positioned relative to the post 98, and contacts the mounting plates 92 in order to supply the correct tension to the butt stop flight 78. The idler shaft 72 is provided with a similar tensioning mechanism.

The butt stop flight 78 (FIG. 5) is driven and supported by the endless chains 82 and 84. Each link of the chains is provided with apertured attachment tabs 110, four such tabs being coplanar, aligned, and held with rivets 112 to a metal butt stop slat 114. The lower end portion of each butt stop slat 114 is bent to provide an outwardly declining ledge 116. The butt stop slats 114 are laterally aligned with similar butt stop slats 114 at the other side of the picking head, and the ledges 116 of the butt stop slats 114 cooperatively form horizontally separated supporting and conveying means for the ears of corn. Thus, the gap between the confronting butt stop ledges 116 is less than the diameter of the smallest ear to be harvested, and as fully described in the above identified Looker application, the gap can be adjusted, before the harvesting machine is placed in operation, by positioning a lever 118 at each side of the picking head; only one of the levers is shown in FIG. 2.

FIG. 4 illustrates the manner in which the inner reach of the butt stop flights 78 is laterally restrained to preserve the width of the gap between the butt stop flights. For this purpose, the butt stop chain 84 slides along the outer face of an upright wear plate 120. The wear plate is mounted on the upright member 121 of a base plate 122 that is movable toward and away from the center of the picking head by adjusting the adjacent lever 118. The other lever 118 at the other side of the machine functions in a like manner for positioning the butt stop flight 88.

The leading end of the picking head P1 (FIGS. 1 and 2) is provided with conventional gathering chains 124 and 126 that are cantilevered from the frame 42, and extend forward of the gathering chain idler shafts 70 and 72. Chain 124 derives its power by means including a sprocket 128 (FIG. 2) on the drive shaft 63, and thus extends the full length of the picker head. The gathering chain 126 is similarly supported and driven, and both chains have pusher lugs 130 (FIG. 4) to engage and drive the stalks rearward.

The normal harvesting of ears from unbroken stalks is accomplished by means including conventional counterrotating knife blade rotors 132 and 134 which are driven by shafts 138 (FIG. 2), one of which is coupled by a shaft 140 to the hydraulic motor 48. Intermeshing gears 135 interconnect the rotors for counterrotation. Above the rotors, the wall 46 is provided with a forwardly open slot 142 to provide a clearance passage for the cornstalks. The slot 142 is wider than the widest adjusted gap between the butt stop ledges 116 so that husks, leaves and other waste foliage have a clear passage into the knife blade rotors for immediate removal from the picking head.

Rotors 132 and 134 straddle a cornstalk S (FIG. 6) as the harvesting machine is moved along the row, and chop into the stalk to positively and rapidly drive it downward. As an ear attached to a stalk is pulled down between the confronting flights of gathering belt slats 114, the butt end is first gripped by the slats because the slats diverge upward as shown in FIG. 4. Meanwhile, the action of the rotors on the stalk tends to draw the stalk into a position normal to the rotors. In this manner, the upright stalk S in FIG. 6 will assume the general position of the stalk S1 as the rotors chop into and pull the stalk down, and the ear E of corn (FIG. 4) is approximately perpendicular to the axes of the rotors.

After the ear E is seated on the ledges 116 of the butt stop flights 78 and 80, the stalk attachment to the ear is severed by the rotors 132 and 134 and the ear continues to be moved rearward by the butt stop flights. It will be seen however, that the lower stalk attachment portion at 150 of the ear E must necessarily depend below the top wall 46 of the frame because the rotors 132 and 134 must have clearance from the top wall. The ears will thus tend to "trip" or tip rearward when they pass beyond the end of the slot 142. Accordingly, it will be apparent that the gripping pressure of the butt stop slats 114 must be firm and uninterrupted if the ear is to be conveyed past the end of the slot 142 in the desired upright growing position. In the structure disclosed in the above identified Looker patent this was found to be the problem area, because gripping control of the ears was insufficient to preserve the conveying motion and upright position of the ears.

FIG. 7 diagrammatically illustrates the functional problems of the prior art apparatus disclosed in the Looker patent. The butt stop flights 78 and 80 supplied gripping pressure on the ears solely from the tension in the butt stop flights, and the flights were laterally unsupported from the rotors 132, 134 to the drive sprockets 66 and 68 with the expectation that the inherent resiliency of the flights would accommodate both small and large ears. In practice, however, when one of the smaller ears cleared the ends of the rotors 132 and 134 (to the position shown for an average size ear E1) the combination of the reduced gripping pressure and the tendency of the ear to "-trip" as above described, caused gripping control of the ear to be momentarily interrupted because of relative horizontal motion between the ear and the butt stop flights.

Accordingly, the small ear would be retarded and further incoming ears and foliage would strike the retarded ear and form a clump C. This tended to spread the butt stop flights apart, with the further adverse result that the butt stop flights would then have an interspacing even greater than before, and so large as to lose gripping control of even ears of the larger sizes, such as the ear E1. It is evident, therefore, that the clump would rapidly build up in size. As soon as the butt stop flights were tensioned enough to grip and carry the clump, it would then be ejected between the drive shafts 58 and 64. By this time, however, the clump would often be larger than the gap between the end of the run of the flights, and compression damage would result, in addition to the abrasive damage caused when the clump accumulated.

The described malfunction has been virtually eliminated by providing means which, in effect, continuously adjust the interspacing of the confronting flights of the moving butt stops in the reaches extending between the discharge ends of the rotors 132 and 134 and the discharge end portions of the butt stop flights. As shown in FIG. 2, two of the upright frame posts 49 are utilized to mount rearwardly extending cantilevered, arched leaf springs 152 and 154. Each spring is adjustably clamped against its mounting post by bolted clamping plates 156, and is adjustable endwise to regulate the force required to displace its free end.

The free end of each spring carries a yoke 158 which mounts a roller 160. In the case of the butt stop flight 78 (FIG. 4), the roller 160 bears against the chain 82 to resiliently bias the flight toward the position shown in FIG. 8. Similarly, the other roller 160 associated with the butt stop flight 80 bears against the chain 86 to resiliently bias the flight 80 in the same manner, so that the two flights converge rearwardly of the rotors 132 and 134, and the butt stop slats 114 in the zone of the rollers are approximately parallel. It will be recalled that the wear strips 120 maintain the lower portions of the butt stop flights 78 and 80 properly interspaced for the length of the rotors 132 and 134. Therefore, because the flights converge rearward from this area, and are resiliently biased toward each other, it will be evident that all ears, regardless of size, are firmly gripped by the butt stop flights. Thus, firm gripping control is achieved for the ear E2, or even smaller ears, and the ear is conveyed rearward without relative horizontal motion between the ear and the butt stop flights.

As the ear E2 progresses to the position shown in FIG. 9, and is followed by successive harvested ears E3, E4 and E5, the butt stop flights maintain proper gripping pressure on all of the ears due to the resilient pressure afforded by the leaf springs 152 and 154, and prevent relative motion between the butt stop flights and the ears. In this manner, the ears keep their interspacing and afford positive prevention of the clumping action above described in connection with the prior art structure shown in FIG. 7. With the ears spaced apart and unclumped, the small amount of entrained foliage is readily separated therefrom as the ears are discharged from the rear of the picking head into the air blast from the blower 40 (FIG. 1). Further, the ears have the shortest contact time with the butt stop flights and are discharged unmarked and undamaged, suitable for their intended use as table corn.

Although the best mode contemplated for carrying out the present invention has been herein shown and described, it will be apparent that modification and variation may be made without departing from what is regarded to be the subject matter of the invention.

What is claimed is:

1. In a mobile corn harvester picking head of the type including a frame, a pair of endless ear-conveying members forming laterally opposed, rearwardly movable corn-gripping reaches mounted on said frame and cooperatively defining a vertically open elongate throat for admitting the cornstalks, said reaches comprising upright confronting flights with frontal surfaces straddling the cornstalks, longitudinal plate means underlying said conveying reaches and providing a forward opening slot beneath a forward portion of the reaches, and stalk severing rotors spaced below said slot; the improvement comprising a presser member engaged with each of said corn-gripping reaches upstream of said slot, and resilient means connected between said frame and said presser members for resiliently biasing said presser members to form a long, V-shaped entry throat for the ears as said reaches grip and advance the ears over said stalk-severing rotors.

2. Apparatus according to claim 1, wherein said presser members are rollers rotatable about upright axes, said resilient means comprising two generally horizontal leaf springs, each spring being connected at one end to one of said rollers, and means anchoring the other end of each spring to said frame.

3. Apparatus according to claim 2, wherein said springs are anchored in preloaded condition, and extend rearward in said frame from their anchor points.

4. Apparatus according to claim 2, wherein each of said anchoring means comprises a clamp arranged to adjustably position the associated spring endwise, the cantilevered overhang of the spring thus being adjustable to provide a selected biasing pressure against the butt stop flight.

5. Apparatus according to claim 1, wherein said endless ear-conveying members have laterally inwardly projecting butt stop means on their lower edges.

* * * * *